UNITED STATES PATENT OFFICE.

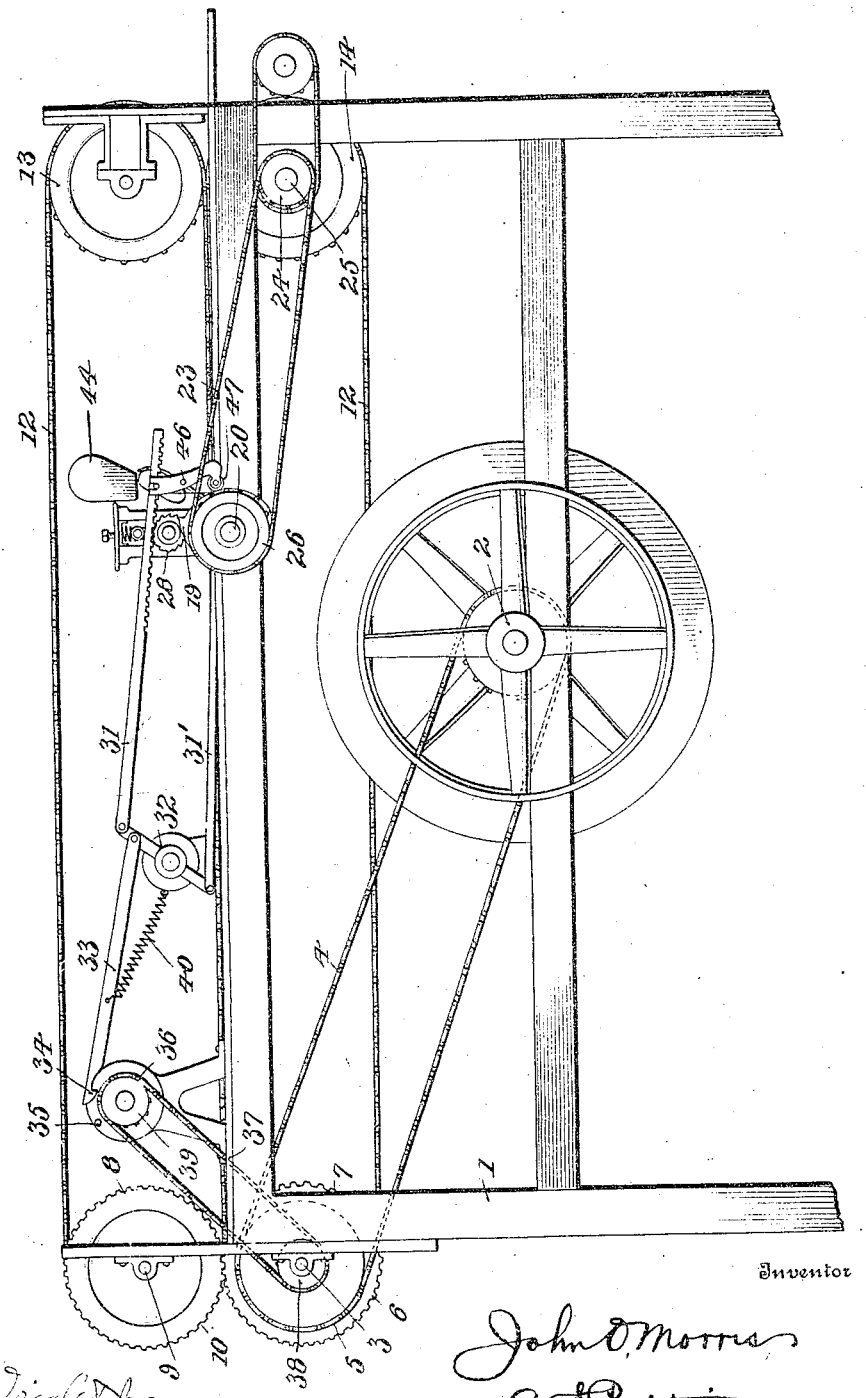

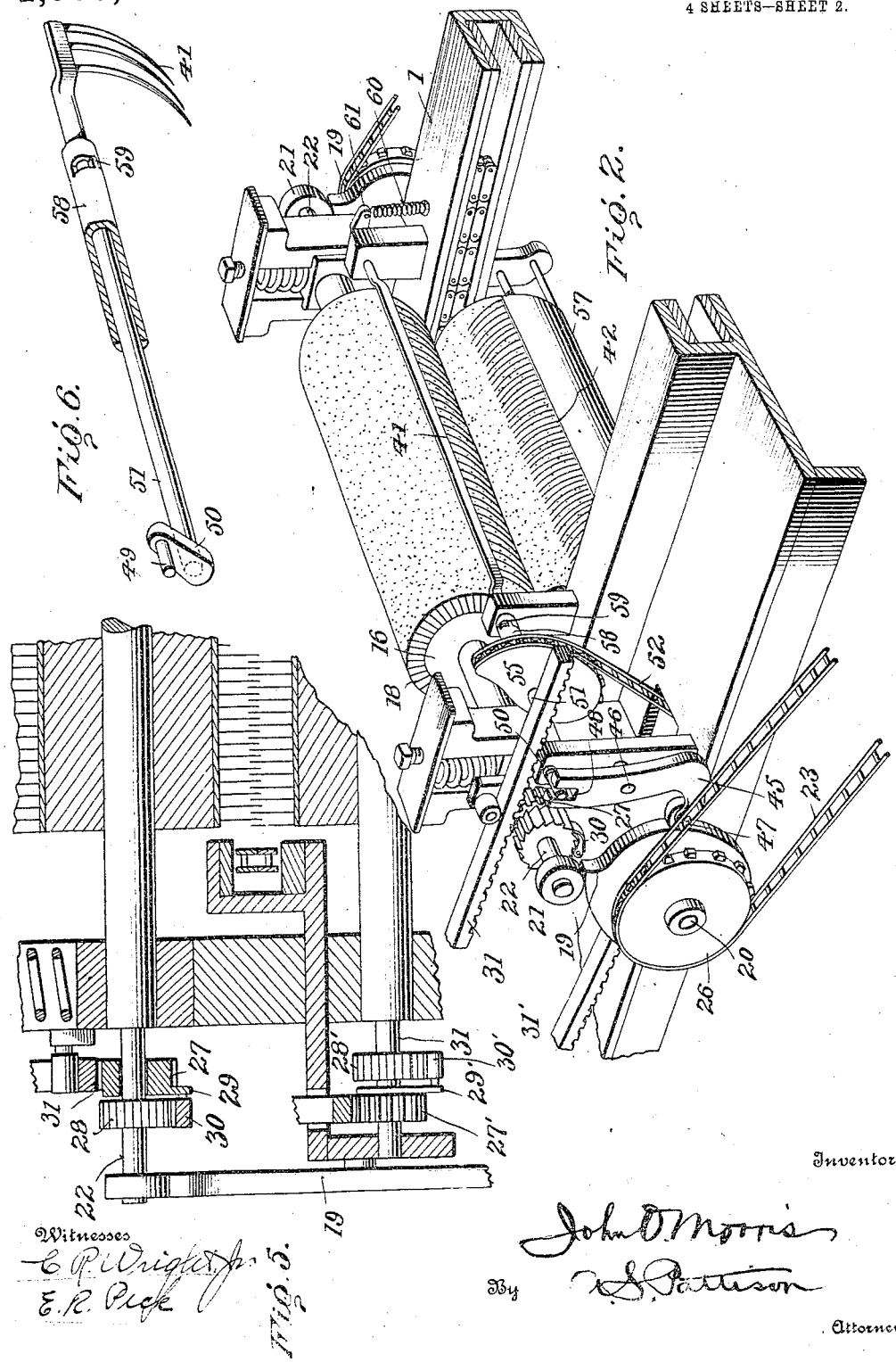

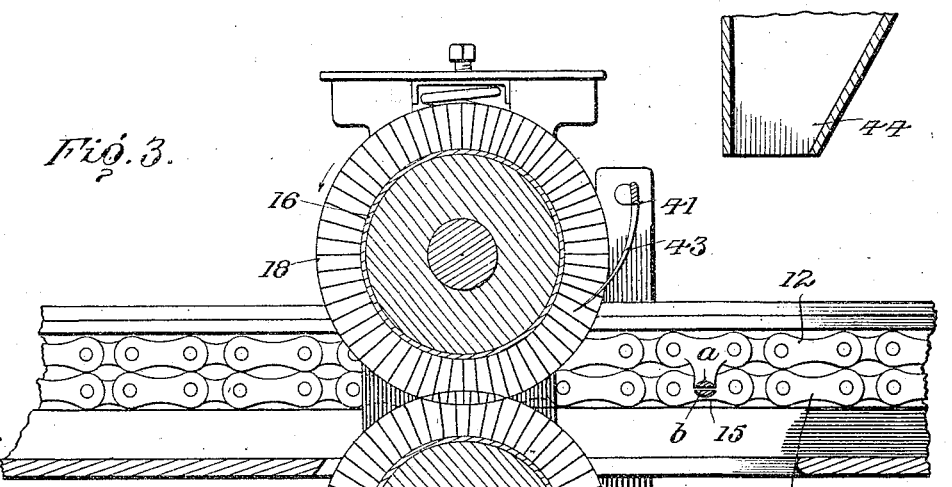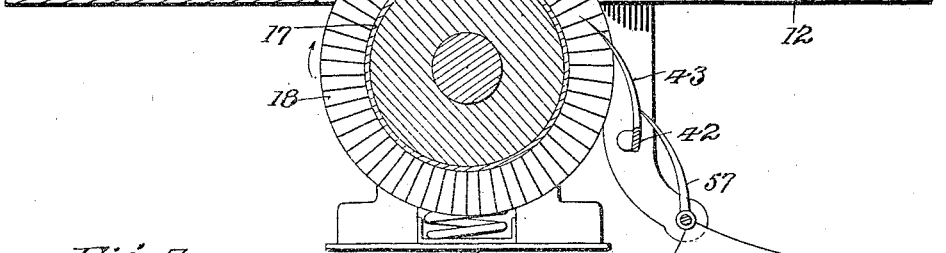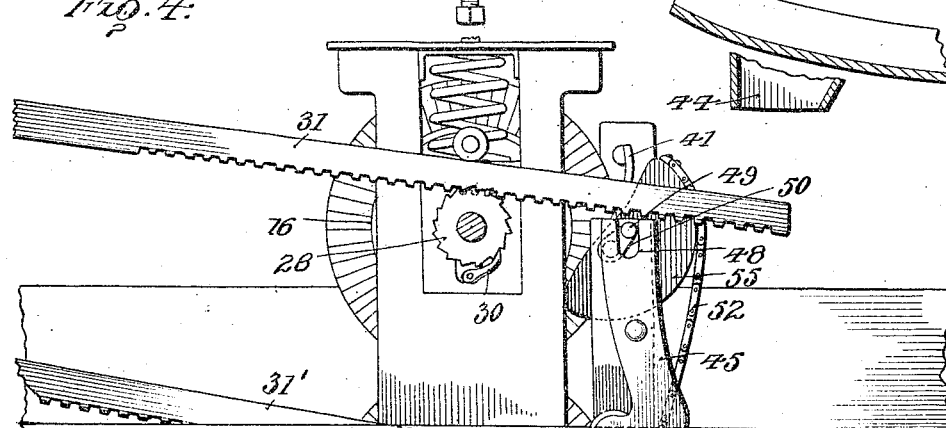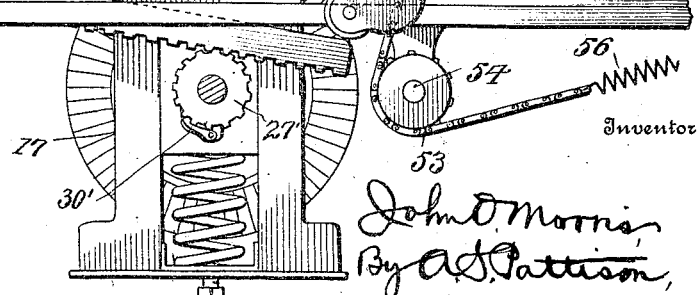

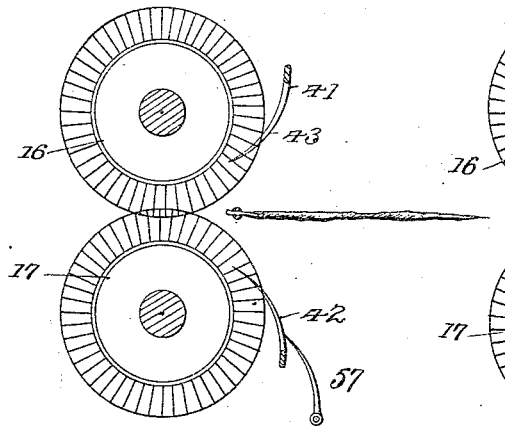
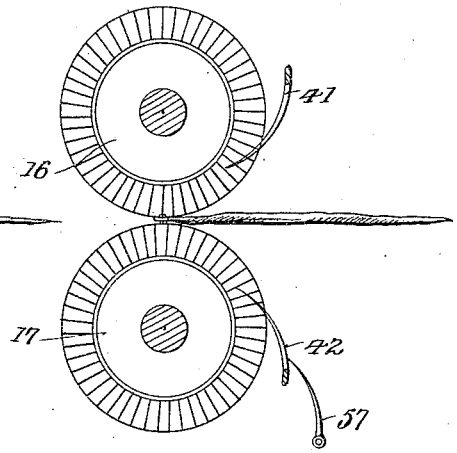
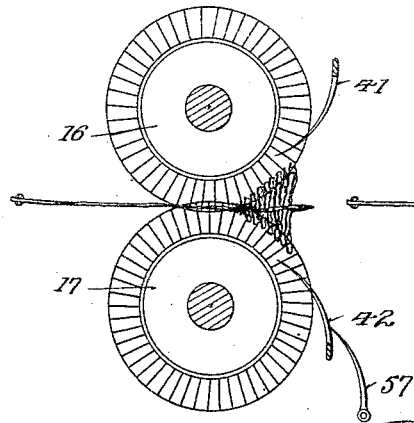
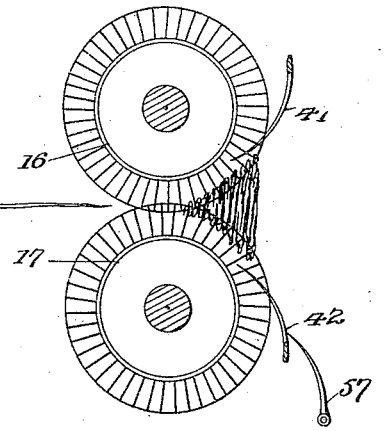
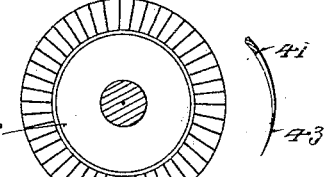

JOHN O. MORRIS, OF WASHINGTON, DISTRICT OF COLUMBIA, ASSIGNOR, BY MESNE ASSIGNMENTS, TO THE TOBACCO STEMMING MACHINE COMPANY, OF BALTIMORE, MARYLAND, A CORPORATION OF DELAWARE.

TOBACCO-STEMMING MACHINE.

1,087,039. Specification of Letters Patent. Patented Feb. 10, 1914.

Application filed July 8, 1908, Serial No. 442,537. Renewed October 24, 1911. Serial No. 656,524.

*To all whom it may concern:*

Be it known that I, JOHN O. MORRIS, a citizen of the United States, residing at Washington, in the District of Columbia, have invented certain new and useful Improvements in Tobacco-Stemming Machines, of which the following is a specification, reference being had therein to the accompanying drawing.

This invention relates to improvements in tobacco stemming machines, and pertains to a machine in which the stripping device comprises a roll composed of closely-assembled stripping teeth, which roll is held stationary, or substantially stationary during the stripping operation, after which the roll is given a clearance movement in a direction opposite to the movement of the leaf, and to some details to which reference will be hereinafter made.

In the accompanying drawings, Figure 1, is a side elevation of a machine which embodies my invention. Fig. 2, is an enlarged perspective view of the stripping device and its immediate coöperating devices. Fig. 3, is an enlarged sectional view taken transverse the stripping roll. Fig. 4, is an enlarged side elevation of the stripping rolls and their coöperating devices. Fig. 5, is a sectional view through one end of the stripping rolls. Fig. 6, is a detailed perspective view of the upper stripped leaf comb. Fig. 7 is a diagrammatic view showing the position of the stripping rolls and the stripped leaf combs just prior to the entrance of the leaf to be stripped. Fig. 8, is a diagrammatic view of the stripping rolls showing them separated to permit the passage of the leaf-holder or grip. Fig. 9, is a diagrammatic view showing the position of the stripping rolls and of the leaf stem with a portion of the blade of the leaf removed. Fig. 10, is a diagrammatic view, showing the position of the stripping rolls and of the leaf stem after the stem is stripped, the position of the combs and of the stripped blade portions of the leaf. Fig. 11, is a diagrammatic view showing the position of the stripping rolls, and the combs after the clearance movement of the combs, and the stripped blade portions being removed by a blast of air.

Referring now to the drawings, 1 is a suitable frame work in which the mechanism is mounted, and 2 is a suitable drive shaft. This drive shaft is operatively connected with a shaft 3 through the medium of a chain 4 and a sprocket wheel 5. This shaft extends across the machine and carries at its opposite end a sprocket wheel similar to the sprocket wheel 6. A gear wheel 7 meshes with a gear wheel 8, whereby the shaft 9, to which the gear wheel 8 is attached, is also rotated. Passing around the sprocket wheels 6 and 10 are suitable sprocket chains 12 and these also pass around sprocket wheels 13 and 14 located at the opposite end of the machine. Suitable grippers 15 comprising upper jaws *a* and lower jaws *b* are carried by these sprocket chains 12, in a manner well known to those skilled in this art, and these grippers grip the butt ends of the leaf stems and carry them to the stripping rolls 16 and 17. The drawings do not illustrate the machine in plan view, but it will be readily understood by those skilled in the art, that the shafts 3, 9, and 25 extend horizontally across the machine, and carry at their opposite ends sprocket wheels corresponding with the sprocket wheels 6, 8, 13 and 14, and that the gripper jaws *a* and *b* also extend across the machine and have their opposite ends connected with the chains, and further illustration is deemed unnecessary. As shown, these stripping rolls are arranged one above the other, and each comprises a plurality of closely-assembled stripping teeth 18 which are preferably yielding. The leaves to be stripped are gripped by these grippers 15 and carried to the stripping rolls, as illustrated in Figs. 7 to 10 inclusive. When the gripper is about to enter between the stripping rolls, the upper stripping roll 16 is elevated, as shown in Fig. 8, by means of cams 19, which are attached to opposite ends of a shaft 20. These cams engage suitable rolls 21 which are upon the opposite ends of the shaft 22 of the upper stripping roll 16. As soon as the gripper passes the center line of the stripping roll the rollers 21 drop behind the cam 19, and the stripping roll assumes the position shown in Figs. 7, 9 and 10. The shaft 20 is a stub-shaft, one located at each side of the machine, and they are rotated in unison through the medium of sprocket chains 23 which pass around sprocket wheels 24 on the shaft 25, and sprocket wheels 26 on the shaft 20.

The stripping rolls 16 and 17 are held stationary or substantially so, during the stripping operation, but after the stripping operation it is necessary to impart to them a backward stripping movement to throw the stripped blade portions from the stripping rolls, and this is effected by providing the shaft 22 of the upper stripping roll with a loose pinion 27, and with a ratchet wheel 28 which is fast to the shaft 22. A suitable plate or member 29 is attached to the pinion 27, and this plate carries a pawl 30 adapted to engage the ratchet wheel 28. A rack bar 31 engages the pinion 27 for the purpose of rotating it, and this rack bar is actuated back and forth in the manner to be presently described. From this description it will be observed that the pinion 27 is permitted to rotate free of the shaft 22 in one direction, but in the opposite direction the pawl and ratchet just described will cause the shaft to be rotated a distance controlled by the movement of the rack bar 31. A similar mechanism is arranged on the shaft 32 of the lower stripping roll 17, but in this instance the pinion 27′ is located outside of the ratchet 28′, and the arm or plate 29′ and pawl 30′ are arranged to coöperate as described in connection with the shaft of the upper stripping roll. A rack bar 31′ is likewise adapted to engage the pinion 27′ and to cause it to rotate. These rack bars 31 and 31′ are connected to opposite ends of an intermediately pivoted lever 32, and this lever is oscillated through the medium of a pivoted ratchet arm 33, one end of which is connected with the upper end of the lever 32, and the other end has a hook 34 adapted to be engaged by a pin 35 that projects from a disk or wheel 36. The disk or wheel 36 is caused to rotate by means of a sprocket chain 37 which passes around a sprocket 38 on the shaft 3, and around the sprocket 39 which is connected with the disk or wheel 36. When the pin 35 engages the hook 34 the lever 32 is oscillated and the upper and lower stripping rolls 16 and 17 are given a rotary movement in the direction indicated by arrows in Fig. 3. This movement serves to partially throw out the stripped blade portions of the leaf. A spring 40 returns the operating parts to the position shown in Fig. 1, but their return movement does not rotate the stripping rolls because when drawn back the ratchets, before described, permit the pinions to rotate free of their shafts.

For the purpose of insuring the complete removal of the stripped blade portions of the leaf, I provide an upper comb 41 and a lower comb 42. These combs comprise a plurality of teeth 43 which project into the stripping teeth, as shown in Fig. 2, when the stripping rolls are given their clearance movement. After the clearance movement of the stripping rolls, which throws the stripped leaf portion backward, the combs are given a backward movement into the position shown in Fig. 11, which throws the stripped leaf portions into the position shown in Fig. 11, and they are then completely removed from the stripping rolls and blown away by a blast from a suitable blower 44.

The backward movement of these combs is accomplished as follows: A lever 45 is intermediately pivoted at the point 46, and carries at its lower end a roller 47 which is adapted to be engaged by the cam 19 and oscillated. The upper end of this lever 45 is provided with a slot 48 in which a pin 49 engages, and this pin is carried by a crank 50 which is on the end of a shaft 51, which causes the shaft 51 to be oscillated when the lever 45 is oscillated, and causes the upper comb 41 to be moved outward. The lower comb 42 is moved outward by means of a chain 52 which passes around a sprocket 53 on the end of the shaft 54 of the lower comb 42. The upper end of this chain 52 is connected with a half circle plate 55, and its lower end is connected with a suitable spring 56. A scraper or shield 57 coöperates with the outer side of the lower comb 42, as shown in Fig. 11, and serves to remove any adhering stripped blade portions therefrom. It is desirable to have the lower comb 42 to move farther than the upper comb, and this is accomplished by a sleeve 58 and a slot and pin connection 59, which permits the shaft 51 to be moved in advance of the movement of the upper comb 41, but imparts a positive movement to the lower comb 42. A spring 60 has its lower end connected to the frame of the machine, and its upper end connected with a crank-arm 61 on the end of the upper comb-shaft, and serves to hold the comb normally into the stripping teeth.

I find by actual practice, that by holding the stripping rolls substantially against rotation, or substantially stationary during the stripping movement, that I am enabled to effectively remove the leaf blades from the stem without injury thereto, and to expeditiously and effectively strip all of the blade portions from the stem.

While it is preferred to impart the stripping movement to the leaf holder, yet it is readily understood that this action could be reversed; that is, the stripping movement (not rotary) may be imparted to the rolls, or to both the rolls and the holder, the essential being that there is a relative stripping movement of the rolls and the leaf holder, and that there is not to be any material rotary stripping movement of the rolls. I desire it to also be understood that it may be possible to impart to the rolls a very slow rotary movement in a direction opposite to the direction of the stripping movement without materially departing from the spirit and scope of my invention, though the best results are accomplished by holding the rolls against any rotary movement whatever during the stripping action, and the claims hereto appended are to be construed in the light of this explanation.

The means here shown for holding the rolls against rotation comprises the bars 31, 31', and the ratchets and pinions which are on the roll shafts, together with the mechanism which is connected with the rack bars.

Having thus described my invention, what I claim and desire to secure by Letters Patent, is:—

1. A tobacco stemming machine having a stripping device comprising a roll having an annulus consisting of peripherally-arranged closely-assembled radially-extending stripping teeth attached thereto, a leaf holder, means for holding the roll against rotation, means for imparting a relative stripping movement to the leaf holder and the roll in a direction transverse the stripping teeth while the roll is held against rotation.

2. A tobacco stemming machine having a stripping device consisting of two parallel rolls each having an annulus consisting of a plurality of peripherally-arranged closely-assembled radially-extending stripping teeth attached thereto, the rolls arranged to cause the stripping teeth to overlap, means for holding the rolls stationary for stripping purposes, a leaf holder, and means for imparting a relative stripping movement to the rolls and holder while the rolls are stationary.

3. A tobacco stemming machine having a stripping device comprising a roll provided with a plurality of peripherally-arranged closely-assembled radially-extending stripping teeth attached thereto, means for holding the roll stationary for stripping purposes, a leaf holder, means for imparting a relative stripping movement to the roll and holder in a direction transverse the teeth while the roll is stationary, and means for imparting a backward clearance rotation after the stripping movement is completed.

4. A tobacco stemming machine having a stripping device consisting of two parallel rolls, each roll having an annulus consisting of a plurality of closely-assembled peripherally-arranged stripping teeth attached thereto, the rolls arranged to have their teeth overlap, a leaf holder, means for imparting a relative stripping movement to the rolls and the leaf holder in a direction between the rolls, means for holding the rolls against rotation during the stripping movement, and means for imparting to the rolls a backward rotary clearance movement after the stripping movement is completed.

5. A tobacco stemmer having a stripping device comprising a member provided with a plurality of closely-assembled stripping teeth, a leaf holder, means imparting a relative stripping movement to the member and leaf holder, a comb entering the teeth of the member adjacent the stripping point, means for holding the member against movement during the stripping action, and means for imparting a backward movement to the member and a backward movement to the comb after the stripping action is completed.

6. A tobacco stemmer having a stripping device consisting of two members each having a plurality of closely-assembled stripping teeth, the members arranged parallel and with the ends of the teeth overlapping, a leaf holder, means imparting a relative stripping movement to the members and the holder in a direction transverse the teeth and between the members, means for holding the members against movement during the stripping action, a downwardly-projecting comb for the upper member having its teeth normally extending into the stripping teeth, an upwardly-projecting comb for the lower member having its teeth normally projecting into the stripping teeth of the lower member, and means imparting to the members a backward clearance movement, and to the combs a backward clearance movement after the stripping movement is completed.

7. A tobacco stemming machine having a stripping device consisting of two members each provided with a plurality of closely-assembled stripping teeth, a leaf holder, means imparting a relative stripping movement to the members and holder, a downwardly projecting comb for the upper member having its teeth normally projecting into the teeth of the upper member, an upwardly-extending comb having its teeth normally projecting into the stripping teeth of the lower member, a scraper engaging the outer side of the lower comb, and means imparting to the members a backward clearance movement and to the combs an outward clearance movement after the stripping movement is completed.

8. A tobacco stemming machine having a stripping device, comprising a curved surface having closely assembled radially extending stripping teeth, the curved surface receding from the stripping plane at opposite sides of the stripping point, a leaf holder, means for holding the curved stripping surface against rotation during the stripping operation, and means for imparting a relative stripping movement to the leaf holder and the curved stripping surface in a direction transverse the stripping teeth.

9. A tobacco stemming machine comprising toothed stripping means, a leaf holder, means for moving same relatively to said stripping means, a movably mounted comb arranged in one position to engage the teeth of said stripping means and in another position to clear said teeth, and means for moving said comb from one such position to another.

10. A tobacco stemming machine comprising toothed stripping means, a leaf holder, means for moving the same relatively to the stripping means, a movably mounted comb with means for operating the same to engage the teeth while the stem is passing through and to move away from the stripping means to remove the leaf after the stem has passed, substantially as described.

In testimony whereof I affix my signature in presence of two witnesses.

JOHN O. MORRIS.

Witnesses:
 JOHN L. FLETCHER,
 CHAS. R. WRIGHT, Jr.